June 21, 1932. D. F. WILHELMI 1,863,954
PROCESS FOR THE PRODUCTION OF HOT VULCANIZED FOOTWEAR
Filed March 13, 1930
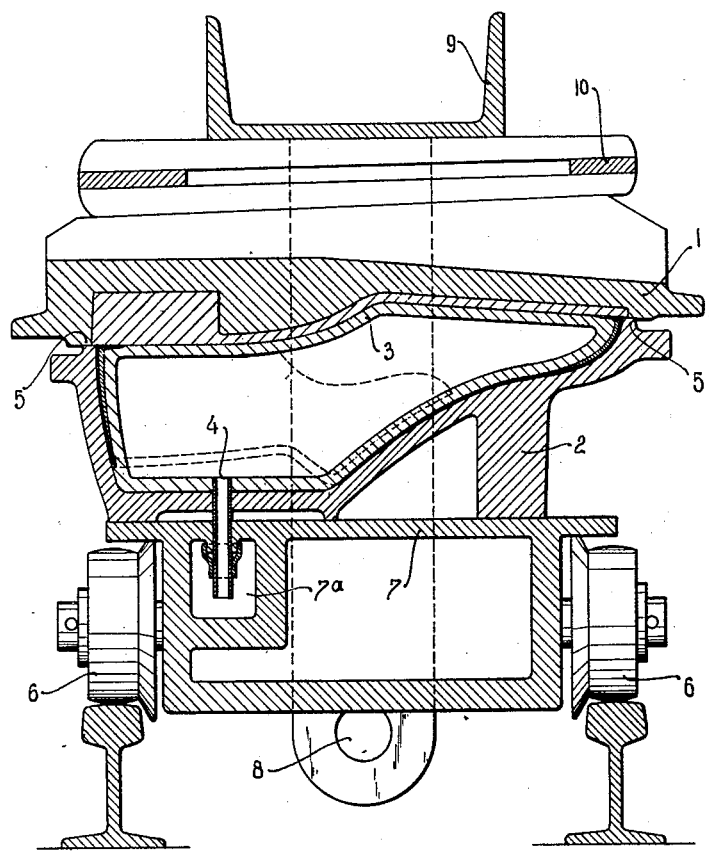
D. F. Wilhelmi
INVENTOR Patented June 21, 1932

1,863,954

UNITED STATES PATENT OFFICE

DIRK FRANS WILHELMI, OF OOSTERBEEK, NETHERLANDS

PROCESS FOR THE PRODUCTION OF HOT VULCANIZED FOOTWEAR

Application filed March 13, 1930, Serial No. 435,570, and in Germany March 16, 1929.

This invention relates to a process for the production of hot vulcanized footwear from any material capable of withstanding the temperatures of the vulcanization, for example for the production of rubber shoes, or shoes with rubber soles and uppers of any suitable fabric.

According to a known process, a prevulcanizing mould is used for the production of such footwear, which mould consists of an upper and a lower part, as also of a rigid last fitting therein with a little play, the joint between the upper and the lower part of the mould corresponding to the line between the sole and the upper of the footwear. The material applied in the mould lower part and around the last is, after the mould has been closed, pressed strongly at a high temperature, whereby the material, brought into a more or less liquid state, fills the hollow spaces of the mould and the desired sharp boundary lines are produced. The shoe or boot so prevulcanized is then finally vulcanized on a finishing last not enclosed by a mould.

With this known process, it is necessary to use a very considerable pressure during the preliminary vulcanizing, in order to impart the desired border lines to the comparatively thick sole, which is often provided with different kinds of insets and stiffeners and frequently with high heels. It is also necessary to place a certain excess quantity of material in the mould, as with the closed mould the hollow space has a quite definite and invariable value and consequently with the use of an insufficient quantity of material this space is not quite filled up. The excess quantity is then squeezed out of the joints between the mould parts and the ridge so formed must afterwards be removed.

According to the invention, the sole and the heel are first brought to the required shape in a preliminary press, and only then combined in a closed vulcanizing mould with the upper fitted on an expanding last. The pressure to be used in the expanding last need not be extraordinarily high in order that the upper may take, in the vulcanizing operation, the shape of the corresponding mould part. On the other hand, even with the use of a very high pressure it would hardly be possible with an expanding last to give the sole the necessary margin lines, on the contrary, the expanding last would conform itself essentially to the shape of the sole.

The use of an expanding last for the object mentioned has the further advantage that the quantity of material to be placed in the mould is not so highly important. In consequence of the expansibility of the last, the hollow spaces of the mould are always completely filled. In addition, no wrinkle can form in the material as is easily possible with the use of a rigid last.

The preliminary pressing of the sole can take place in a separate mould. Preferably, however, the lower part of the vulcanizing mould is used for this purpose, which naturally means a saving of time and a simplification.

In so far as the upper of the shoe is to be produced from rubber if necessary with woven insertions, a high polish can be imparted thereto by enamelling inner faces of the upper part of the mould.

The new process will be more fully described with respect to the accompanying drawing which represents a closed vulcanizing mould in longitudinal section.

The vulcanizing mould, which is run into the vulcanizing apparatus in the upside down position and which is therefore shown in this position, consists in known manner of the lower part 1 for the sole and the heel, and the upper part 2 for the upper or leg, as also of the last 3 which according to the invention consists of a thick walled rubber bladder with a valve 4. The contact surfaces 5 of the two mould parts 1 and 2 are worked perfectly flat, for example being planed, so that the joints may be made quite tight.

First, the lower part of the mould 1 is used by itself for the preliminary pressing of the sole. For this purpose, this part is filled with the material to be used, for example with a bottom layer of good rubber for the tread, offering great resistance to wear, then an intermediate layer of inferior quality material, also any necessary stiffenings, and if desired a covering layer of felt or the like leaving free the under-mentioned adhesive strips, whereupon this mass is so strongly compressed in a suitable apparatus by means of a die that it takes up exactly the shape of the mould and its upper surface is flush with the surface 5.

Meanwhile, on the expanding last 3 the shoe upper or leg is assembled. For this purpose, there is preferably placed a spraining sole on the lower side of this last and the shaft fitted round the last is temporarily pasted with its edges to the spraining sole. The toe piece and the heel are strengthened, while the edges of the shaft engaging the spraining sole have a narrow rubber adhesive strip fitted thereon. The last is then placed in the mould upper part 2, the valve 4 projecting through a hole in this part of the mould. Finally, the part of the mould containing the previously pressed sole is placed on the mould part 2, which is in the upside down position and which takes the last with the foot, and pressed in a clamping apparatus with the surfaces 5 tightly one on the other.

The clamping apparatus illustrated consists of a comparatively long box 7 provided with wheels 6, with a chamber 7a of smaller section running in the longitudinal direction and which can be connected to a pipe for supplying water under pressure. The upper surface of this container, suited to receive a number of vulcanizing moulds, has a corresponding number of holes for the passage of the valves 4. A longitudinal beam 9 hinged by pins 8 to the container 7 forms the bearing for wedges 10 by means of which the mould parts 1 and 2 may be clamped against each other with the necessary pressure.

After the carriage has taken the necessary number of filled vulcanizing moulds, it is run into the vulcanizing apparatus, and water under pressure is admitted into the chamber 7a and thereby into the lasts 3. The pressure thereby created in the last 3 presses the leg material against the inner wall provided, if necessary, with engraving, and also presses the more or less liquid material of the sole against the edge of the mould part 2 provided with flutes, while the sole is firmly united with the shaft.

The decorations, so important for high women's walking boots with rubber shafts are, however, preferably not produced by engraving the mould but by attaching to the shaft, in the assemblage thereof, rubber strips or the like, which may be differently coloured.

It would be useless making the fluting during the preliminary pressing of the sole, as it would then flow out during the vulcanizing, unless the edge of the mould part 2 were provided with exactly mating flutes. When using a rigid last, the production of the fluting may present difficulties for the above-mentioned reasons.

It is preferable to so make the mould parts 1 and 2 that the walls of the mould spaces incline everywhere more or less inwards from the plane 5 so that the hot vulcanized shoe on the last 3 can be easily removed from the mould. It then only needs a further free finishing vulcanization on a finishing last to obtain the desired final shape. It would be also possible to obtain the final shape straight away in the vulcanizing mould 1, 2 but then either the upper mould part would have to be made in two parts, or the expanding last 3 would have to undergo each time on the removal of a hot vulcanized shoe from the vulcanizing moulds, a deformation which would affect its durability. The production known in itself in two stages is consequently far better.

What I claim is:

A process for the production of hot vulcanized footwear in a mould and on a pneumatic last consisting in subjecting the sole and heel while in the lower part of the mould and before the vulcanizing to a preliminary pressing, arranging the shoe upper on the last and within the upper part of the mould and uniting the mould sections together, and finally placing the pneumatic last under pressure during vulcanizing to unite the upper to the sole and heel of the shoe.

In testimony whereof I affix my signature.

DIRK FRANS WILHELMI.